Figure 1:
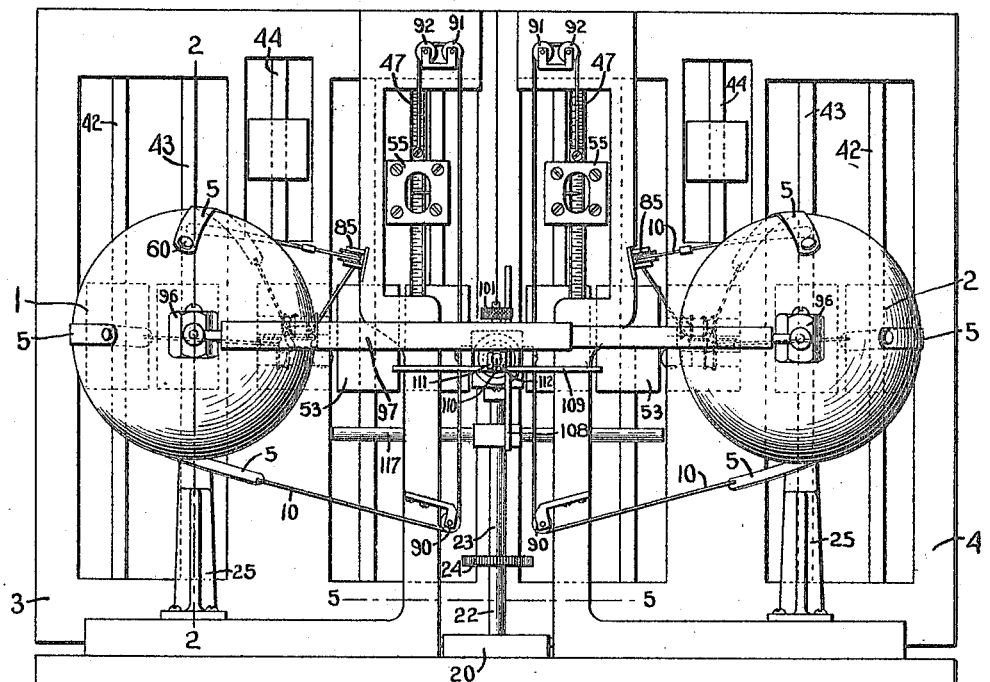

G. A. SUFFA.
OPHTHALMOTROPE.
APPLICATION FILED JULY 10, 1914.

1,135,222.

Patented Apr. 13, 1915.
3 SHEETS—SHEET 1.

Witnesses.
J. Morrill Fuller
Alice G. Nixon

Inventor.
George A. Suffa
by Heard Smith & Tennant.
Att'y's

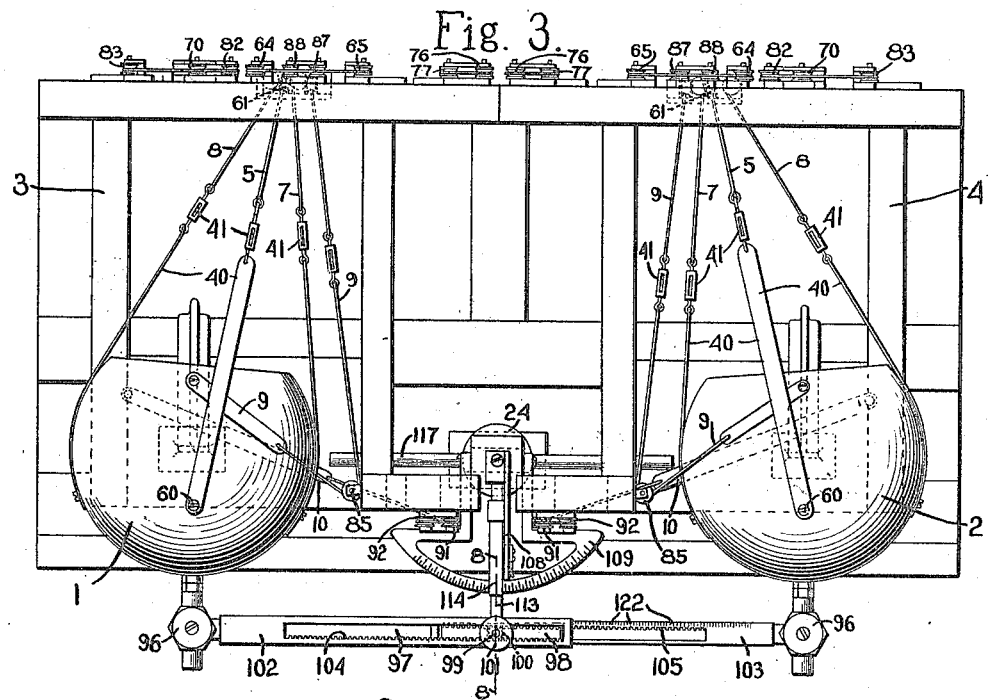
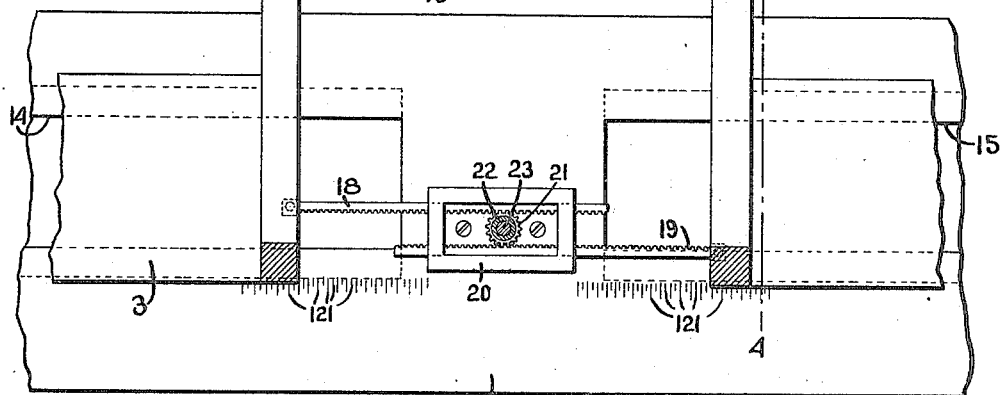

G. A. SUFFA.
OPHTHALMOTROPE.
APPLICATION FILED JULY 10, 1914.
1,135,222.
Patented Apr. 13, 1915.
3 SHEETS—SHEET 3.
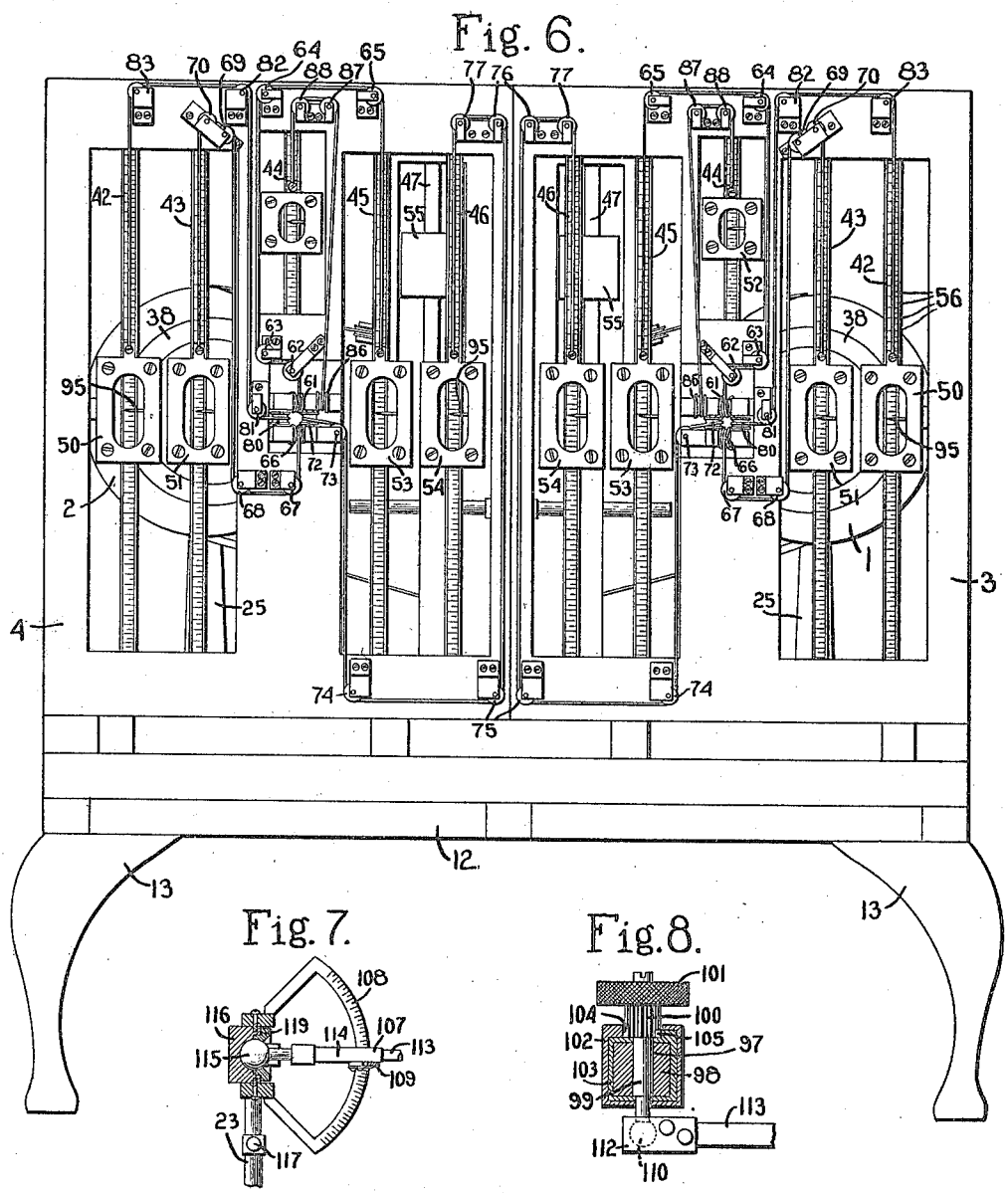
Witnesses.
J. Morrill Fuller
Alice G. Nixon
Inventor.
George A. Suffa
by Heard Smith & Tennant.
Att'y's.

UNITED STATES PATENT OFFICE.

GEORGE A. SUFFA, OF BOSTON, MASSACHUSETTS.

OPHTHALMOTROPE.

1,135,222.   Specification of Letters Patent.   Patented Apr. 13, 1915.

Application filed July 10, 1914. Serial No. 850,081.

*To all whom it may concern:*

Be it known that I, GEORGE A. SUFFA, citizen of the United States, residing at Boston, county of Suffolk, State of Massachusetts, have invented an Improvement in Ophthalmotropes, of which the following description, in connection with the accompanying drawing, is a specification, like characters on the drawing representing like parts.

This invention has reference to an ophthalmotrope of novel and improved construction.

The invention has for an object to provide a device whereby the position and movements of the eye and the position and operation of the muscles controlling the same may be studied by comparative analysis.

The nature and objects of the invention will more fully appear from the following specification and accompanying drawings and the novel features will be particularly pointed out in the claims.

Figure 2:
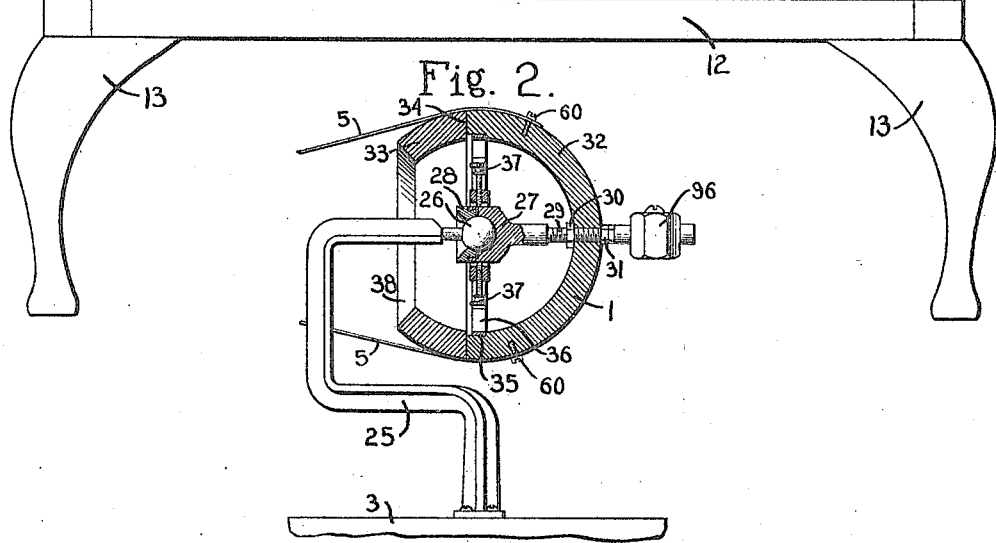

Referring to the drawings in which I have shown a selected embodiment of my invention by way of illustration, Figure 1 is a front elevation of a device illustrative of my invention; Fig. 2 is a sectional detail view of the same taken on the line 2—2 Fig. 1; Fig. 3 is a plan view; Fig. 4 is a sectional detail view taken on the line 4—4 Fig. 5; Fig. 5 is a sectional detail view taken on the line 5—5, Fig. 1; Fig. 6 is a rear elevation; Fig. 7 is a sectional detail view taken on the line 8—8 Fig. 1, and Fig. 8 is a sectional detail view taken on the line 8—8 Fig. 3.

My invention provides a movably mounted member representing the eye with preferably flexible members connected thereto, representing the muscles and means whereby the operation of the parts may be observed. In the preferred form two members representing a pair of eyes are provided whereby the relative position and operation may be studied and demonstrated.

Referring particularly to the construction illustrated, the eyes are represented by substantially spherical members 1 2 desirably supported in a manner to permit universal pivotal movement. These members are desirably mounted upon laterally movable carriages 3, 4 to permit adjustment to vary the distance between the spherical members to correspond to the variation found to exist in the distance between the eyes in various individuals. The carriages and the several devices mounted thereon are duplicates as will be clearly understood.

Flexible members 5 to 10 representing the muscles are attached to each spherical member in such a manner as to permit the same relative movements as occur during natural movements of the eyes and suitable means is provided to facilitate observation of the operation.

The carriages 3, 4 are slidably mounted upon a base 12 having legs 13 as indicated in Figs. 1 and 6. The base is provided with suitable ways 14, 15 to receive the slides 16 of the carriages as indicated in Figs. 4 and 5. The rear portion of each carriage rests upon an auxiliary way 17. I prefer to provide means for moving the carriages laterally which will cause both carriages to move the same distance. Referring to Fig. 5, racks 18, 19 are secured to the respective carriages and extend through a guide 20 and engage opposite sides of a pinion 21. This pinion is secured to a quill shaft 22 rotatably mounted on an upright member 23 and may conveniently be rotated by a milled disk 24 (Figs. 1 and 3) secured to the upper end of the quill shaft.

In Fig. 2 I have shown in detail a convenient support for the spherical member which is desirably hollow. A stand 25 is secured to the carriage 3, the upper end of the stand extending horizontally and being provided with a ball 26 and the sphrical member being provided with a corresponding socket member 27. A retaining ring 28 screws into the socket member, thus completing a ball and socket joint. The socket member is positioned substantially centrally in the spherical member but inasmuch as it is debated whether the eye rotates about its exact center I prefer to provide means for adjusting the position of the socket member. This is accomplished in the construction illustrated by forming the socket member integral with a screw 29 which extends through the forward portion of the spherical member and is held in adjusted position by a nut 30 within and by a nut 31 upon the outside. The spherical member is made in two parts 32, 33 joined at 34, (Fig. 2) and the forward part is recessed as indicated at 35 to receive a frame 36 which provides lateral support for the socket member 27. Setscrews 37 secure the socket member in adjusted position relative to this frame. The rear portion of the spherical member is left open as indicated at 38 sufficiently to permit angular movement, this opening extending somewhat more to the inner side as indicated in Fig. 3 in order that the greater inward movement of the eye may be simulated by the device.

The flexible members 5 to 10 are represented as pivotally connected to the spherical member and are therefore permitted to slide over the surface of the spherical member as it rotates in the same manner that the muscles of the eye slide over the surface of the eye-ball. Any suitable material may be used in the construction of the flexible members. I have illustrated members, the attaching ends of which are formed of thin strips of steel such as indicated at 40 in Fig. 3. Turn buckles are desirably provided as indicated at 41 to facilitate adjustment.

Each carriage is desirably constructed to provide upright portions having guide rods 42, to 47 upon which weights 50 to 55 are slidably mounted. Each flexible member is connected to a weight which holds it taut and by its movement upon its respective guide rod indicates the extent of operation. The guide rods are desirably marked to provide indicating scales as indicated at 56 in Fig. 6. All the guide rods are similarly graduated as will be readily understood though part are indicated only diagrammatically.

Referring specifically to the several flexible members connected to the spherical member 1, the flexible member 5 corresponding to the superior rectus muscle in pivotally connected to the spherical member 1 as indicated at 60 and extends rearwardly to the pulley 61 (Figs. 3 and 6) and thence around pulleys 62 to 65 to the slide 53. The flexible member 6 representing the inferior rectus muscle extends rearwardly around the pulleys 66 to 70 to the slide 51. The flexible member 7 representing the interior rectus muscle extends around the pulleys 72 to 77 to the slide 54. The flexible member 8 representing the external rectus muscle extends around the pulleys 80 to 83 to the slide 50. The flexible member 9 representing the superior oblique muscle extends around the pulley 85 (Fig. 3) representing the trochlea, thence around the pulleys 86, 87, 88 to the slide 52. The flexible member 10 representing the inferior oblique muscle extends around the pulleys 90, 91, 92 (Fig. 1) to the slide 55 which is seen at the front of the device.

It will be noted that each slide is provided with an index as indicated at 95 in Fig. 6 in order to facilitate reading of the scale marked upon the respective guide rod.

The flexible members representing the recti muscles of each eye converge as in the human eye and the relative angles are maintained. It will be noted that the lines from the center of the spherical members to the point toward which the muscles converge lie at an angle of about 25 degrees to each other as best noted in Fig. 3. This is to correspond with the relation of the eye-sockets, and muscles as found in the human eye.

When the spherical members 1, 2 are in the position indicated in the drawings which corresponds to the so-called primary position of the eyes, the slides are all at the zero points of their respective scales.

Suitable means is provided to cause the two spherical members to move in unison, this means preferably also preventing rotation of each member about its primary axis or what is called torsion when referring to the eye. In the construction illustrated, the screws 29 project through the forward faces of the spherical members and blocks 96 are fixedly secured thereto, to which blocks the opposite ends of an adjustable link 97 are pivotally connected. The pivotal connection is the equivalent of a hinge joint wherefore rotation of either sperical member about its primary axis is prevented. The construction of the link 97 is best shown in Figs. 3 and 8. A comparatively short central block 98 provides support for a shaft 99 having a pinion 100 rotatably mounted thereon. A knurled head 101 provides means for rotating the pinion. The end sections 102, 103 are telescopically arranged relative to each other and to the block, the section 102 being provided with a rack 104 engaging one side of the pinion 100 and the section 103 being provided with a similar rack 105 engaging the opposite side of the pinion. Upon rotation of the pinion the end sections move equally away from the shaft 99.

A protractor device is desirably provided to indicate the direction of the principal axes of the sperical members. The device illustrated comprises a pivoted arm 107 and graduated segments 108 and 109 to indicate the vertical and horizontal angular movement. The free end of the arm 107 is pivotally connected to the link 97, the shaft 99 being extended through slots in the end sections and provided with a ball 110 for this purpose. The end of the arm 107 is provided with socket-forming members 111, 112 to engage the ball to provide a ball and socket joint. The arm 107 is preferably made in telescoping sections 113, 114 the inner section 113 being connected to the link 97. This construction facilitates disconnection and removal of the link from the apparatus when desired.

The section 114 of the pivoted arm is provided with a ball 115 at its inner end which fits into a socket 116 supported from the bed 112 of the device by the upright member or rod 23. A cross bar 117 is suitably connected to the upright 23 as best indicated in Fig. 1 and extends laterally through bearings in the carriages to cause the socket member to be held in fixed position, as will be readily understood. The segment 109 is pivoted in a manner to permit pivotal movement only in a vertical plane and the segment 108 is pivoted in a manner to permit pivotal movement only in a horizontal plane. The pivots of each of these segments are on a line with the center of the ball 115. The parts are so proportioned that the length of the arm 107 is equal to the distance from the center of the spherical member to the point of pivotal attachment of the link 97, whereby the pivotal movement of the arm 107 will accurately represent the pivotal movement of the spherical members. It will be understood also that the arm 107 extended would at all times practically meet the extended principal axes of the spherical members when the spherical members are so adjusted that these axes converge, such point corresponding of course to the point at which the eyes are focused. The protractor mechanism therefore gives accurately the direction of the line which represents the line of sight even when the eye-representing members are turned to simulate focusing on a near object.

I prefer to provide graduations upon the base as indicated at 121 Fig. 5 and to indicate the positions of the carriages and thus the distance between the spherical members and graduations 122 upon the adjustable link 97 to indicate the length of this link between pivots. In this manner I provide a convenient means for determining the amount of convergence or divergence of the principal axes corresponding to the convergence or divergence of the anterior posterior axes of the eyes.

It will be clear from the foregoing description that I have provided a mechanical device having parts which simulate the action of the eyes and of the muscles thereof, thereby representing all the movements which the eye makes in all directions showing exactly which muscles are concerned, just what movement and how much movement each muscle makes and keeping the vertical planes parallel with each other in all positions. An auxiliary mechanism shows the exact direction of the primary axis of the eye-representing members and another mechanism converges the same at a point showing the amount of convergence and at the same time again showing the action of each and every muscle in all these movements.

Having fully described my invention, what I claim as new and desire to obtain by Letters Patent is:

1. In a device of the character described, in combination, a movable member arranged to represent the eye, flexible members connected thereto and arranged to represent the muscles of the eye and means to indicate which flexible members are concerned in a given movement of the movable member and to what extent.

2. In a device of the character described, in combination, a pivoted member to represent the eye, flexible members connected thereto in a manner to represent the muscles of the eyes, slides connected to said flexible members to be moved thereby as the pivoted member moves and scales arranged to indicate the extent of movement of said slides.

3. In a device of the character described, in combination, a pair of pivoted members to represent a pair of eyes, flexible members connected to said pivoted members in a manner to represent the muscles of the eyes and means to indicate the direction of the axes of the pivoted members and means to indicate the effect of the position thereof upon the flexible members.

4. In a device of the character described, in combination, a pair of pivoted members to represent a pair of eyes, means for indicating the direction of the primary axes thereof, means for changing the relative angular positions of said axes, flexible members connected to said pivoted members and representing the muscles of the eye and means for indicating the extent of longitudinal movement of said flexible members due to given changes of position of said pivoted members.

5. In a device of the character described, in combination, relatively movable carriages, spherical members pivotally mounted on said carriages said spherical members being arranged to represent the eyes flexible members attached to each spherical member and arranged in a manner to represent the muscles of the eye and means to indicate the extent of longitudinal movement of said flexible members upon given pivotal movement of said spherical members.

6. In a device of the character described, in combination, relatively movable carriages, spherical members pivotally mounted on said carriages, said spherical members being arranged to represent the eyes, flexible members attached to each spherical member and arranged in a manner to represent the muscles of the eye, means to indicate the extent of longitudinal movement of said flexible members upon given pivotal movement of said spherical members, a link of adjustable length pivotally connected to similar portions of said spherical members and protractor means connected with the center of said link to indicate the angular movement of said pivoted members.

7. In a device of the character described, in combination, relatively movable carriages, spherical members pivotally mounted on said carriages, said spherical members being arranged to represent the eyes flexible members attached to each spherical member and arranged in a manner to represent the muscles of the eye, means to indicate the extent of longitudinal movement of said flexible members upon given pivotal movement of said spherical members, a link of adjustable length pivotally connected to similar portions of said spherical members, protractor means connected with the center of said link to indicate the angular movement of said pivoted members and means for indicating the degree of convergence of the axes of said spherical members.

8. In a device of the character described, in combination, a spherical member adjustably mounted upon a pivotal support, means for adjusting the pivotal point of support of said member, a plurality of flexible members attached to said spherical member and means to indicate the effect upon said flexible members of movements of said spherical member.

9. In a device of the character described in combination spherical members mounted for universal pivotal movement said spherical members being arranged to represent a pair of eyes, members attached to each spherical member in a manner to represent the muscles of the eyes and means to cause said spherical members to move in unison and to prevent rotation of either spherical member about its primary axis.

10. In a device of the character described in combination, a pair of spherical members mounted for pivotal movement said spherical members being arranged to represent a pair of eyes a longitudinally adjustable link and a hinged connection between each of said spherical members and the adjacent end of said link acting to prevent rotation of the spherical member about its primary axis which axis extends from said connection through the pivotal center of the spherical member.

11. In a device of the character described in combination a pair of movably mounted spherical members to represent a pair of eyes, a pivoted arm connected to said spherical members to move in unison therewith, a protractor mechanism to indicate the angular position of said arm comprising a pair of segments positioned at right angles to each other and each pivotally mounted in a manner to permit pivotal movement in one plane only.

12. In a device of the character described, in combination, a pair of movably mounted spherical members to represent a pair of eyes, a link similarly connected at its opposite ends to said spherical members comprising a central member, a pinion rotatably mounted therein and end sections slidable relative to said central member and having racks engaging opposite sides of said pinion.

13. In a device of the character described a support, a pair of carriages movable upon said support, means for causing equal movements of said carriages upon the support, spherical members to represent eyes mounted for pivotal movement upon said carriages, flexible members pivotally connected to the spherical members in a manner to represent the muscles of the eyes, upright graduated rods and slides upon said rods and connected to the spherical members whereby the effect upon the flexible members of movement of the spherical members may be clearly indicated.

In testimony whereof, I have signed my name to this specification, in the presence of two subscribing witnesses.

GEORGE A. SUFFA.

Witnesses:
 MAURICE B. LANDERS,
 THOMAS J. DRUMMOND.

Copies of this patent may be obtained for five cents each, by addressing the "Commissioner of Patents, Washington, D. C."